United States Patent

Nishiguchi et al.

[11] Patent Number: 6,122,930
[45] Date of Patent: Sep. 26, 2000

[54] ABSORPTION REFRIGERATING MACHINE

[75] Inventors: Akira Nishiguchi, Ushiku; Ryoko Sakiyama, Abiko; Tomihisa Ohuchi, Tsukuba; Michihiko Aizawa, Ushiku, all of Japan

[73] Assignee: Hitachi, Ltd., Tokyo, Japan

[21] Appl. No.: 09/248,129

[22] Filed: Feb. 10, 1999

[30] Foreign Application Priority Data

Mar. 19, 1998 [JP] Japan .................................. 10-069792

[51] Int. Cl.$^7$ .................................................. F25B 15/00
[52] U.S. Cl. .............................. 62/476; 62/483; 62/485; 62/335; 62/141
[58] Field of Search ........................... 62/476, 483, 485, 62/335, 141

[56] References Cited

U.S. PATENT DOCUMENTS

| Re. 36,045 | 1/1999 | Rockenfeller et al. ................... 62/476 |
| 5,044,174 | 9/1991 | Nagao ....................................... 62/476 |
| 5,177,979 | 1/1993 | Gianfrancesco ........................... 62/335 |
| 5,284,029 | 2/1994 | Keuper et al. ............................. 62/476 |
| 5,572,884 | 11/1996 | Christensen et al. ..................... 62/476 |

FOREIGN PATENT DOCUMENTS

| 402078866 | 3/1990 | Japan . |
| 405018626 | 1/1993 | Japan . |
| 405332633 | 12/1993 | Japan . |
| 406137703 | 5/1994 | Japan . |

*Primary Examiner*—William Doerrler
*Assistant Examiner*—Chen-Wen Jiang
*Attorney, Agent, or Firm*—Antonelli, Terry, Stout & Kraus, LLP

[57] ABSTRACT

There is disclosed an absorption refrigerating machine in which evaporators as well as absorbers are arranged in a two-stage manner. A refrigerant, heated by a regenerator, is condensed by a condenser, and then is fed to a first evaporator. The refrigerant, produced in the first evaporator, is absorbed by a first absorber, formed integrally with the first evaporator, and is formed into an intermediate solution, and then is fed to a second absorber. The second absorber comprises a spray absorber which obviates the need for providing a heat-transfer pipe therein. The condensed refrigerant is supplied to a second evaporator, formed integrally with the second absorber, from a refrigerant tank formed at a lower portion of the condenser or at a lower portion of the first evaporator. The refrigerant, fed to the second evaporator, is absorbed by the solution sprayed in a supercooled condition in the second absorber, thereby producing a dilute solution. Part of the dilute solution, raised in temperature by absorbing the refrigerant, is returned to the first evaporator, and exchanges heat with liquid refrigerant, condensed in the condenser, to be cooled. The cooled dilute solution is again sprayed in the second absorber. The dilute solution in the second absorber is kept in a supercooled condition, and therefore the chilled water or brine, flowing through a heat-transfer pipe, provided in the second evaporator, can be kept to a low temperature under 0° C.

23 Claims, 6 Drawing Sheets

ABSORPTION REFRIGERATING MACHINE

BACKGROUND OF THE INVENTION

The present invention relates to an absorption refrigerating machine, and more particularly, to an absorption refrigerating machine having a large pumping-up temperature difference and an absorption refrigerating machine suitable for low temperature generation of not more than 0° C.

An example of an absorption refrigerating machine having a large pumping-up temperature difference and an absorption refrigerating machine capable of producing a low temperature under 0° C., is disclosed in JP-A-7-139844. In this prior art, evaporators and absorbers are arranged in a two-stage manner so that the pumping-up temperature difference from the low temperature side to the high temperature side can be made large. And besides, an absorbent is mixed into a refrigerant to lower the solidifying point of the refrigerant. With this construction, the evaporation of the refrigerant becomes possible also in the temperature under 0° C. and low temperature generation becomes possible.

In the construction disclosed in this prior art publication, since two sets of evaporators and absorbers are used, evaporation heat-transfer surface and absorption heat-transfer surface respectively become double. Therefore, the number of heat-transfer pipes or the number of heat-transfer plates increase, which leads to a disadvantage that the cost increases.

The above prior art publication also discloses an example in which one evaporator comprises a flash evaporator, and refrigerant, cooled by this evaporator, cools an absorber, and with this construction the number of heat-transfer pipes is reduced. In this case, however, the power of a refrigerant pump is increased.

And besides, although the concentration of mixed refrigerant is varied in accordance with the generating temperature, liquid refrigerant is caused to flow to a solution side without being evaporated, and therefore the refrigerant is used inefficiently. This leads to a disadvantage that the overall efficiency is lowered.

SUMMARY OF THE INVENTION

It is an object of the present invention to achieve a low-cost design by reducing the heat-transfer surfaces and the number of pumps in an absorption refrigerating machine in which a pumping-up temperature difference is large and a low temperature can be produced.

Another object of the present invention is to achieve high efficiency by reducing an amount (proportion) of flowing of liquid refrigerant to solution side so as to eliminate the inefficient use of the refrigerant when adjusting the concentration of mixed refrigerant in an absorption refrigerating machine in which a pumping-up temperature difference is large and a low temperature can be produced.

A first characteristic feature of the present invention to achieve the above objects resides in an absorption refrigerating machine comprising a low-temperature evaporator and a high-temperature evaporator which are arranged in a two-stage manner; and a low-temperature absorber and a high-temperature absorber which are arranged in a two-stage manner; wherein the low-temperature absorber comprises a spray absorber, and a solution, raised in temperature by absorbing a refrigerant in the low-temperature absorber, is fed to the high-temperature evaporator to be cooled, and the cooled solution is sprayed in the low-temperature absorber.

A second characteristic feature of the present invention to achieve the above objects resides in an absorption refrigerating machine comprising a regenerator for heating an absorption solution; a condenser for condensing the refrigerant fed from the regenerator; a first evaporator for vaporizing the refrigerant condensed by the condenser, the first evaporator having a heat-transfer pipe provided therein, through which pipe a fluid to be cooled flows; a second evaporator having a heat-transfer pipe through which chilled water or brine flows; a first absorber for causing the refrigerant, vaporized in the first evaporator, to be absorbed by a solution, the first absorber having a first solution pump; and a second absorber which has a second solution pump and a spray device, and causes the refrigerant, vaporized in the second evaporator, to be absorbed by the absorption solution, and supplies the absorption solution, having absorbed the refrigerant, to the spray device by the use of the second solution pump; wherein there is provided a pipe for feeding the absorption solution in the second absorber to the heat-transfer pipe in the first evaporator.

Preferably, the first evaporator comprises a refrigerant sprinkling device for sprinkling the liquid refrigerant, and refrigerant-collecting means provided at a lower portion thereof for collecting that portion of the sprinkled refrigerant which has not vaporized, and the second evaporator comprises a refrigerant tank provided at a lower portion thereof for storing the refrigerant, and the refrigerant-collecting means of the first evaporator is communicated with the refrigerant tank of the second evaporator.

Preferably, the refrigerant tank of the second evaporator is disposed at a level below the refrigerant-collecting means of the first evaporator.

It is desirable that the condenser has a liquid refrigerant-collecting portion provided at a lower portion thereof, and the liquid refrigerant-collecting portion is communicated with the refrigerant sprinkling device of the first evaporator, and there is provided solution mixing means for supplying the absorption solution in the second absorber to the refrigerant in the second evaporator.

Preferably, there is provided solution mixing means for supplying the absorption solution in the first absorber or the second absorber to the refrigerant in the second evaporator. Alternatively, it is preferable to provide refrigerant outflow means for feeding the liquid refrigerant in the second evaporator to the second absorber or a suction side of the second solution pump.

Further, it is preferable to provide (a) refrigerant outflow means, which comprises a pipe, communicating the refrigerant tank of the second evaporator with the second absorber or the suction side of the second solution pump, and a first control valve provided in the pipe, (b) second sprinkling means for sprinkling the mixed solution in the second evaporator, (c) concentration detection means for detecting the concentration of the mixed solution supplied to the second sprinkling means by the second refrigerant pump, and (d) a control device for controlling an amount of at least refrigerant and solution flowing in or flowing out from the second evaporator; and the solution mixing means comprises an absorption solution pipe for feeding the absorption solution in the second absorber to the second evaporator and a second control valve provided in the absorption solution pipe, and the control device controls the first and second control valves in accordance with a concentration signal detected by the concentration detection means.

Further, it is preferable that the first evaporator comprises refrigerant sprinkling means for sprinkling the liquid refrigerant, refrigerant-collecting means provided at a lower portion thereof for collecting that portion of the sprinkled refrigerant which has not vaporized and a first refrigerant pump for feeding the refrigerant in the refrigerant-collecting means to the refrigerant sprinkling means, and the second evaporator comprises a refrigerant tank provided at a lower portion thereof for storing the refrigerant, and there are provided (a) solution mixing means for supplying the absorption solution in the first absorber or the second absorber to the second evaporator, (b) a refrigerant pipe for supplying the liquid refrigerant from the condenser to the first evaporator, (c) a connection pipe connecting a discharge side of the first refrigerant pump to the second refrigerant tank, (d) a third control valve provided in the connection pipe, (e) second sprinkling means for sprinkling the mixed solution in the second evaporator, (f) concentration detection means for detecting the concentration of the mixed solution fed to the second sprinkling means, and (g) a control device for controlling the third control valve in accordance with a concentration signal detected by the concentration detection means.

It is preferable to provide solution mixing means which comprises a first pipe for feeding the liquid refrigerant, collected in the second evaporator, to the second absorber or the suction side of the second solution pump, a first control valve provided in the first pipe, a second pipe for feeding the absorption solution in the second absorber to the second evaporator and a second control valve provided in the second pipe, and there is provided liquid level detection means for detecting a liquid level of the mixed refrigerant in the second evaporator, and the control device has memory means for storing a target value of the concentration of the refrigerant in the second evaporator and one of upper and lower limit values of the liquid level in the second evaporator, and the third control valve is controlled using the refrigerant concentration detected by the concentration detection means and the target concentration stored in the memory means, and the liquid level detected by the liquid level detection means is compared with one of the upper and lower limit values stored in the memory means, and when the detected liquid level is higher than upper limit, the first control valve is opened for a predetermined period of time.

Desirably, the solution mixing means comprises a pipe communicating the discharge side of the second solution pump with the second evaporator or the suction side of the second refrigerant pump, and the second control valve provided in the pipe. Alternatively, it is desirable that the solution mixing means comprises (a) absorption solution-collecting means for collecting the absorption solution sprinkled in the second absorber, the absorption solution-collecting means being disposed at a level above the second refrigerant tank, (b) a pipe communicating the absorption solution-collecting means with the second refrigerant tank, and (c) the second control valve provided in the pipe.

Preferably, the liquid level detection means comprises an upper limit liquid level switch for detecting an upper limit value of the liquid level and a lower limit liquid level switch for detecting a lower limit value of the liquid level, and when the upper limit liquid level switch is operated, the control device opens the first control valve for the predetermined period of time, and when the lower limit liquid level switch is operated, the control device opens the second control valve for a predetermined period of time.

A third characterizing feature of the present invention to achieve the above objects resides in an absorption refrigerating machine comprising a first evaporator, a second evaporator, a first absorber, a second absorber, a regenerator, a condenser and a solution heat exchanger, and water is used as a refrigerant and a water solution of salt is used as an absorbent, and the first absorber has a first solution pump and the second absorber has a second solution pump, and heat exchange means for cooling absorption heat generated in the second absorber is provided in the first evaporator, and vapor of the refrigerant produced in the first evaporator is fed to the first absorber, and vapor of the refrigerant produced in the second evaporator is fed to the second absorber, and there is provided solution mixing means which feeds the absorption solution in one of the first absorber and the second absorber to the second evaporator.

It is preferable that a first heat-transfer pipe, through which the fluid to be cooled flows, is provided in the first evaporator, and a second heat-transfer pipe is provided in the second absorber, and there is provided a communication pipe communicating the second heat-transfer pipe with the first heat-transfer pipe.

It is preferable that there are provided (a) a refrigerant pipe for supplying the liquid refrigerant from the condenser to the first evaporator, (b) a first refrigerant pump for supplying the refrigerant to the first evaporator, (c) a connection pipe connecting the discharge side of the first refrigerant pump to a second refrigerant tank, (d) a third control valve provided in the connection pipe, (e) second sprinkling means for sprinkling the mixed solution in the second evaporator, (f) concentration detection means for detecting the concentration of the mixed solution supplied to the second sprinkling means, and (g) a control device responsive to a concentration signal detected by the concentration detection means so as to control the third control valve.

It is preferable that there are provided (a) a second refrigerant pump for supplying the refrigerant to the second evaporator, (b) a second communication pipe communicating the discharge side of the second refrigerant pump with the second absorber or the suction side of the second solution pump, (c) refrigerant outflow means having a first control valve provided in the second communication pipe and (d) a liquid level detection means for detecting a liquid level of the mixed refrigerant in the second evaporator, and the solution mixing means comprises an absorption solution pipe for feeding the absorption solution in the second absorber to the second evaporator and a second control valve provided in the absorption solution pipe, and the control device has memory means for storing a target value of the concentration of the refrigerant in the second evaporator and one of upper and lower limit values of the liquid level in the second evaporator, and the control device controls the third control valve by using the refrigerant concentration detected by the concentration detection means and the target concentration stored in the memory means, and the liquid level detected by the liquid level detection means is compared with one of the upper and lower limit values stored in the memory means, and if the detected liquid level is higher than upper limit, the first control valve is opened for a predetermined period of time.

The solution mixing means may comprise a third communication pipe communicating the discharge side of the second solution pump with the second evaporator or the suction side of the second refrigerant pump, and the second control valve provided in the third communication pipe. Alternatively, the solution mixing means may comprise (a) absorption solution-collecting means for collecting the absorption solution sprinkled in the second absorber, the absorption solution-collecting means being disposed at a level above the second refrigerant tank, (b) a fourth communication pipe communicating the absorption solution-collecting means with the second refrigerant tank, and (c) the second control valve provided in the fourth communication pipe.

The liquid level detection means may comprise an upper limit liquid level switch for detecting an upper limit value of the liquid level and a lower limit liquid level switch for detecting a lower limit value of the liquid level, and when the upper limit liquid level switch is operated, the control device opens the first control valve for the predetermined period of time, and when the lower limit liquid level switch is operated, the control device opens the second control valve for a predetermined period of time.

The first evaporator may comprise a refrigerant sprinkling device for sprinkling the liquid refrigerant and refrigerant-collecting means provided at a lower portion thereof for collecting that portion of the sprinkled refrigerant which has not vaporized, and the second evaporator comprises a refrigerant tank provided at a lower portion thereof for storing the refrigerant, and the refrigerant-collecting means is communicated with the refrigerant tank.

There may be provided refrigerant outflow means for feeding the liquid refrigerant in the second evaporator to the second absorber or the suction side of the second solution pump.

It is preferable that there are provided (a) refrigerant outflow means which comprises a pipe communicating the refrigerant tank with the second absorber or the suction side of the second solution pump and a first control valve provided in the pipe, (b) solution mixing means which comprises a pipe for feeding the absorption solution in the second absorber to the second evaporator and a second control valve provided in the pipe, (c) second sprinkling means for sprinkling the mixed solution in the second evaporator, (d) concentration detection means for detecting the concentration of the mixed solution supplied to the second sprinkling means by the second refrigerant pump and (e) a control device for controlling the first and second control valves in accordance with a concentration signal detected by the concentration detection means.

DESCRIPTION OF THE PREFERRED EMBODIMENTS

Figure 1:
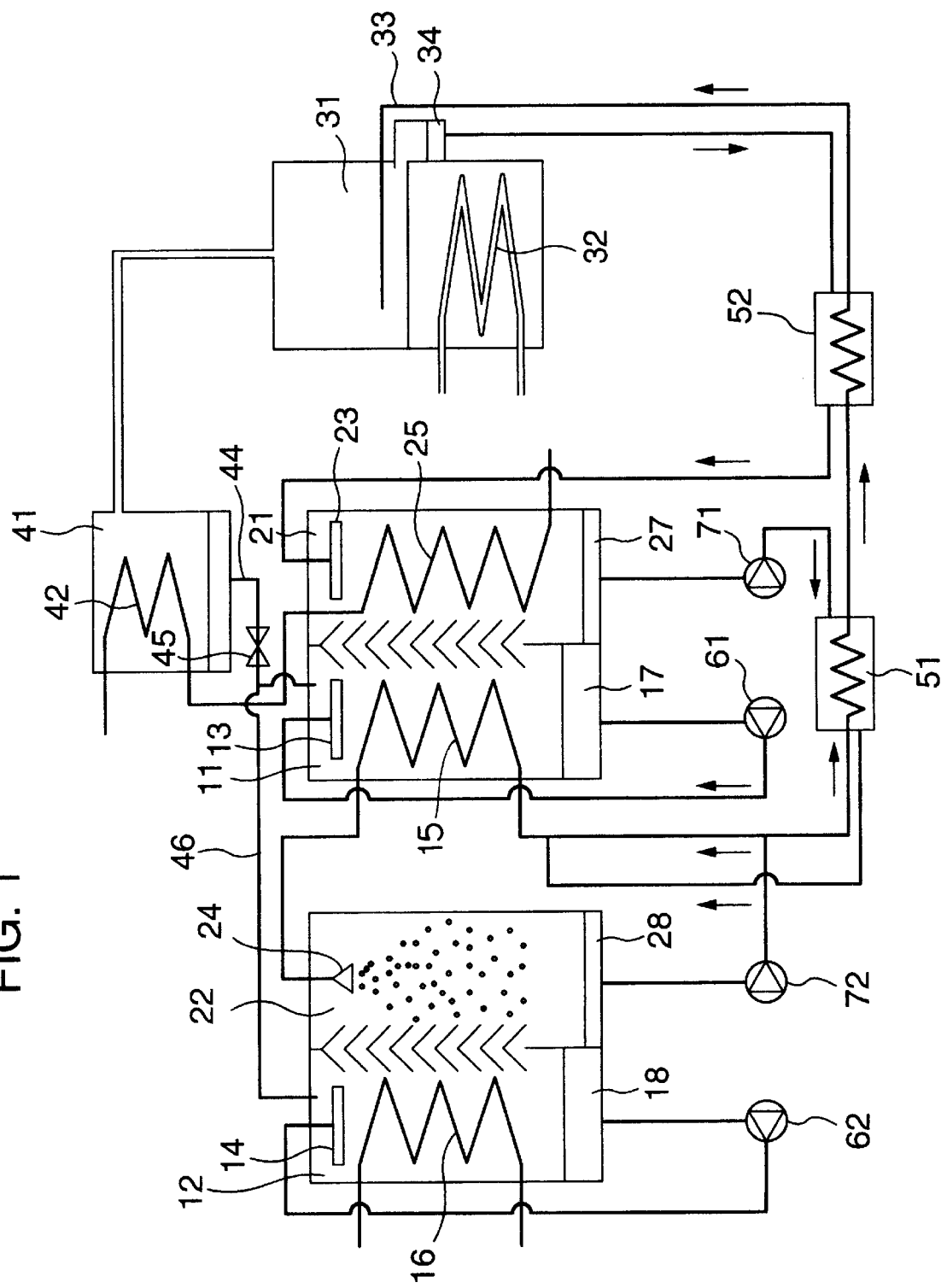
FIG. 1 is a system diagram of a first embodiment of an absorption refrigerating machine of the present invention.

Several embodiments of the present invention will be described with reference to the drawings. FIG. 1 is a system diagram of a first embodiment of an absorption refrigerating machine of the present invention. The absorption refrigerating machine comprises a first evaporator 11, a second evaporator 12, a first absorber 21, a second absorber 22, a regenerator 31, a condenser 41, solution heat exchangers 51 and 52, refrigerant pumps 61 and 62, and solution pumps 71 and 72. The absorption refrigerating machine of this construction operates as follows.

A heat-transfer pipe 15, through which a solution from the second absorber 22 flows, is provided in the first evaporator 11. A liquid refrigerant, fed from the condenser 41 to the first evaporator 11, is stored in a refrigerant tank 17, and this liquid refrigerant is fed to a sprinkling (dispensing) device 13 by the refrigerant pump 61. The sprinkling device 13 sprinkles the refrigerant liquid over the heat-transfer pipe 15, and the solution, flowing through the interior of the heat-transfer pipe 15, is cooled by the latent heat of vaporization when the liquid refrigerant vaporizes on the surface of the heat-transfer pipe 15.

A heat-transfer pipe 25, through which cooling water flows, is provided in the first absorber 21. The (concentrated) solution, heated and concentrated by the regenerator 31, is sprinkled from a solution-sprinkling device 23 onto the heat-transfer pipe 25. At this time, the concentrated solution absorbs the vapor of the refrigerant vaporized in the evaporator 11. With this absorbing action, the pressure in the first evaporator 11 is kept to a low level, so that the refrigerant, sprinkled over the heat-transfer pipe 15, can vaporize continuously.

The absorption heat, produced when the refrigerant vapor is absorbed, is carried away by the cooling water flowing through the heat-transfer pipe 25. The solution, lowered in concentration by absorbing the refrigerant vapor, is stored in a solution tank 27. Thereafter, this solution is fed to the solution heat exchanger 51 by the solution pump 71, and exchanges heat with the solution fed from the second absorber 22. Then, this solution is combined with the solution from the solution pump 72, and is fed to the heat-transfer pipe 15 in the first evaporator 11.

A heat-transfer pipe 16, through which chilled water or brine flows, is provided in the second evaporator 12. The refrigerant liquid, fed from the condenser 41 to the second evaporator 12, is stored in a refrigerant tank 18, and this refrigerant liquid is fed to a sprinkling device 14 by the refrigerant pump 62. The sprinkling device 14 sprinkles the refrigerant liquid over the heat-transfer pipe 16, and the cooling water or the brine, flowing through the interior of the heat-transfer pipe 16, is chilled by the latent heat of vaporization when the liquid refrigerant vaporizes on the surface of the heat-transfer pipe 16.

The second absorber 22 comprises a spray absorber, and supercooled solution is sprayed from a spray device 24, and absorbs the vapor of the refrigerant vaporized in the second evaporator 12. With this absorbing action, the pressure in the second evaporator 12 is kept to a low level, so that the refrigerant, sprinkled over the heat-transfer pipe 16, can vaporize continuously. The solution (droplets 26), raised in temperature and lowered in concentration by absorbing the refrigerant vapor, is stored in a solution tank 28. Thereafter, this solution is fed to the first evaporator 11 and the solution heat exchanger 51 by the solution pump 72.

The solution, fed to the first evaporator 11, is joined with the solution, fed from the solution heat exchanger 51, on the route, and flows through the heat-transfer pipe 15. The solution, while flowing through the heat-transfer pipe 15, is cooled by vaporization of the refrigerant flowing down outside this pipe, and is fed in a supercooled condition to the spray device 24 of the second absorber 22.

The solution, fed from the solution pump 72 to the solution heat exchanger 51, exchanges heat with the solution from the first absorber 21 to be raised in temperature, and then is fed to the solution heat exchanger 52. In the solution heat exchanger 52, the solution, fed from the solution heat exchanger 51, exchanges heat with the solution from the regenerator 31 to be raised in temperature, and then is fed to the regenerator 31 via a solution inflow pipe 33.

A heat-transfer pipe 32 is provided in the regenerator 31, and steam, serving as a heat source, flows through this heat-transfer pipe 32. The solution, fed to the regenerator 31, is heated and boiled by the steam flowing through the heat-transfer pipe 32, and the vapor of the refrigerant, separated from the solution, is fed to the condenser 41. The solution, concentrated as a result of separation of the refrigerant vapor, flows out from a solution outlet portion 34, and is fed to the solution heat exchanger 52, and exchanges heat with the solution from the solution heat exchanger 51, and then is fed to the sprinkling device 23 of the first absorber 21.

A heat-transfer pipe 42 is provided in the condenser 41, and the cooling water, fed from the absorber 21, flows through the heat-transfer pipe 42. The refrigerant vapor, fed from the regenerator 31, is cooled and condensed on the surface of the heat-transfer pipe 42 by the cooling water, flowing through the heat-transfer pipe 42, and is stored in a refrigerant tank 43 provided at a lower portion of the condenser 41. This liquid refrigerant is fed to the first evaporator 11 and the second evaporator 12 via a refrigerant pipe 44, a throttle 45 and a refrigerant pipe 46, and is stored in the refrigerant tank 17 and the refrigerant tank 18.

In this embodiment of the above construction, it is not necessary to provide a heat-transfer pipe in the second absorber 22, and the cost of this heat-transfer pipe can be saved, and the cost of the overall system can be reduced. And besides, as compared with the case where the first evaporator is connected to the second absorber via a heat-conveying medium, the solution, raised in temperature in the second absorber, is led directly to the passage in the pipe in the first evaporator, and is cooled. Therefore, the temperature difference, required for effecting the heat exchange, can be decreased, and the overall cycle performance can be made highly efficient.

Figure 2:
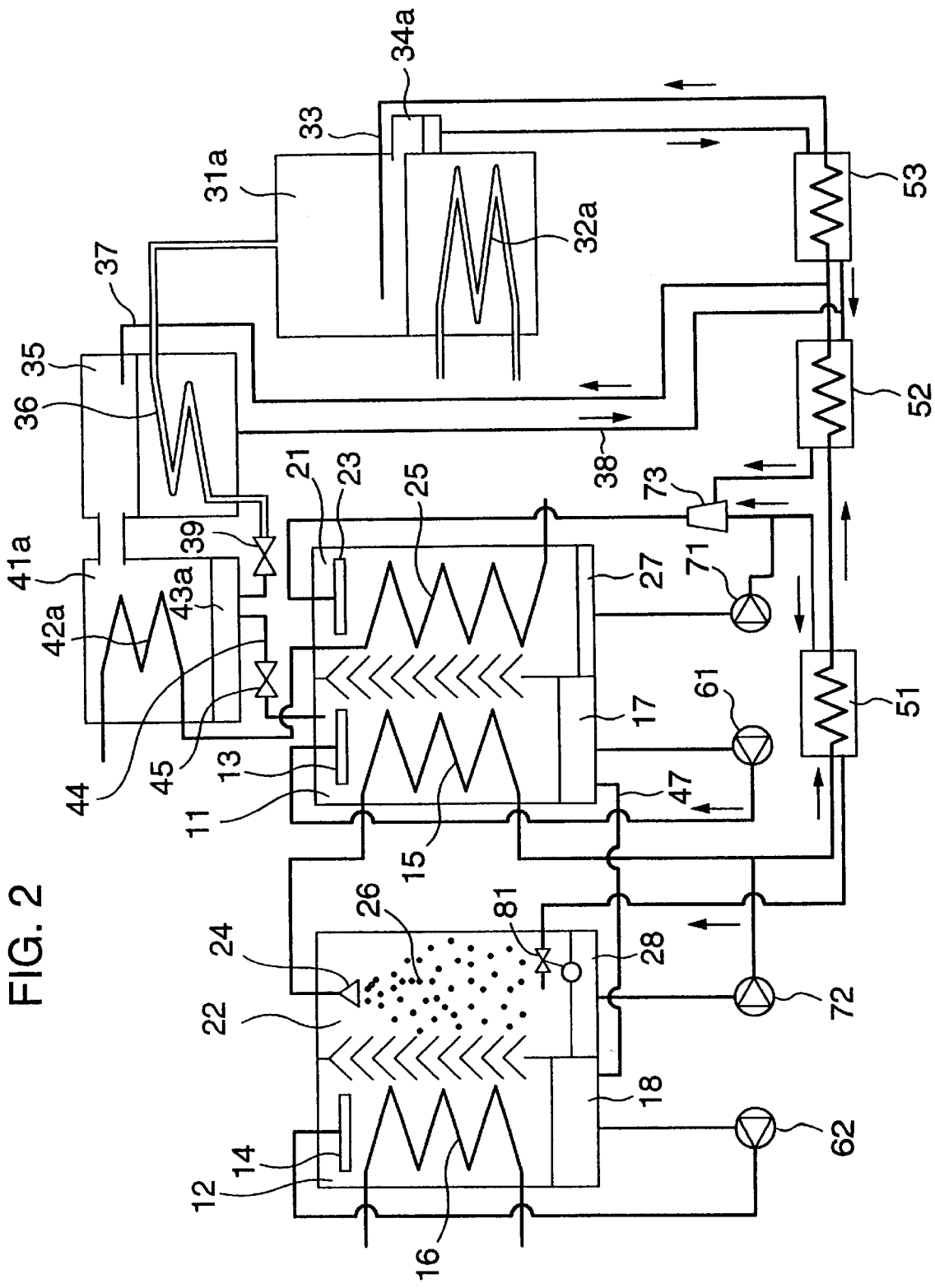
FIG. 2 is a system diagram of a second embodiment of an absorption refrigerating machine of the invention.

Next, a second embodiment of an absorption refrigerating machine of the invention will be described with reference to FIG. 2. This second embodiment differs from the first embodiment in the following points (1) to (4). (1) A high-temperature regenerator and a low-temperature regenerator are provided so as to achieve a double-effect cycle. (2) An ejector pump 73 is provided at the discharge side of a solution pump 71 of a first absorber 21 so as to draw a concentrated solution fed from a solution heat exchanger 52, and this concentrated solution is led to a sprinkling device 23 of absorber 21, and is sprinkled over a heat-transfer pipe 25. (3) A refrigerant, fed from a regenerator 41, is made to flow serially from a first evaporator to a second evaporator, and there is provided a pipe 47 communicating a refrigerant tank 17 of the first evaporator 11 with a refrigerant tank 18 of the second evaporator 12. (4) There is provided a float valve 81 for controlling an amount of the solution fed from the first absorber to the second absorber.

The above difference (1) will be described more specifically. The solution, fed from a solution pump 72 to the solution heat exchanger 52, exchanges heat with the solution from the high-temperature regenerator 31a and the solution from the low-temperature regenerator 35. Then, part of this solution is fed to the low-temperature regenerator 35 via a solution inflow pipe 37 while the remainder is fed to the high-temperature regenerator 31a via a solution heat exchanger 53 and a solution inflow pipe 33. The solution, fed to the high-temperature regenerator 31a, is heated and boiled by steam flowing through a heat-transfer pipe 32a in the high-temperature regenerator 31a, and the produced vapor of the refrigerant is fed to the low-temperature regenerator. The solution, concentrated as a result of separation of the refrigerant vapor, is fed from a solution outlet portion 34a to the solution heat exchanger 53.

A heat-transfer pipe 36 is provided in the low-temperature regenerator 35, and the refrigerant vapor, fed from the high-temperature regenerator 31, flows through this pipe. On the other hand, the solution, fed to the low-temperature regenerator 35, is heated and boiled by the vapor flowing through the heat-transfer pipe 36, and the separated refrigerant vapor is fed to a condenser 41a. The solution, concentrated as a result of separation of the refrigerant vapor, flows through a solution outflow pipe 38, and is joined with the solution fed from the high-temperature regenerator 31 via the solution heat exchanger 53, and then is fed to the solution heat exchanger 52. The solution, which has exchanged heat with the solution fed from the solution heat exchanger 51, in the solution heat exchanger 52, is fed to the suction side of the ejector pump 73, and is joined with the solution fed from the solution pump 71, and is fed to the sprinkling device 23 of the first absorber 21. The refrigerant, which has been fed from the high-temperature regenerator 31 and has been condensed by heating the solution during flowing through the heat-transfer pipe 36 of the low-temperature regenerator 35, is fed to a refrigerant tank 43a of the condenser 41a via a throttle 39.

With the above difference (2), the (concentrated) solution, heated and concentrated in the high-temperature regenerator 31a and the low temperature regenerator 35, and the solution, fed from a solution tank 27 by the solution pump 71, are mixed together by the ejector pump 73, and this mixed solution is sprinkled over the heat-transfer pipe 25 by the solution-sprinkling device 23. With the above difference (3), the provision of the refrigerant pipe 46 for feeding the condensed refrigerant simultaneously to the first and second evaporators 11 and 12, is omitted. The refrigerant tank 17 of the first evaporator 11 is communicated with the refrigerant tank 18 of the second evaporator 12 by the refrigerant pipe 47. Part of the refrigerant, which has not been vaporized in the first evaporator 11, is fed to the refrigerant tank 18 of the second evaporator 12. With the above difference (4), the solution, fed to the solution heat exchanger 51, exchanges heat with the solution fed from the second absorber 22, and then is fed to a solution tank of the second absorber 22 via the float valve 81.

In this embodiment of the above construction, there are provided the two regenerators, that is, the high-temperature regenerator and the low-temperature generator so as to achieve the double-effect cycle, and therefore the performance of the cycle is enhanced. And besides, the ejector pump is provided at the discharge side of the solution pump of the first absorber, and the concentrated solution from the regenerator is drawn, and this concentrated solution is sprinkled over the heat-transfer pipe in the first absorber. Therefore, the heat-transfer performance of the absorber is enhanced, and the overall performance of the cycle is enhanced. The refrigerant tank of the first evaporator is communicated with the refrigerant tank of the second evaporator, and the liquid refrigerant is flowed serially from the first evaporator to the second evaporator, and therefore the refrigerant is automatically distributed to the first evaporator and the second evaporator.

Figure 3:
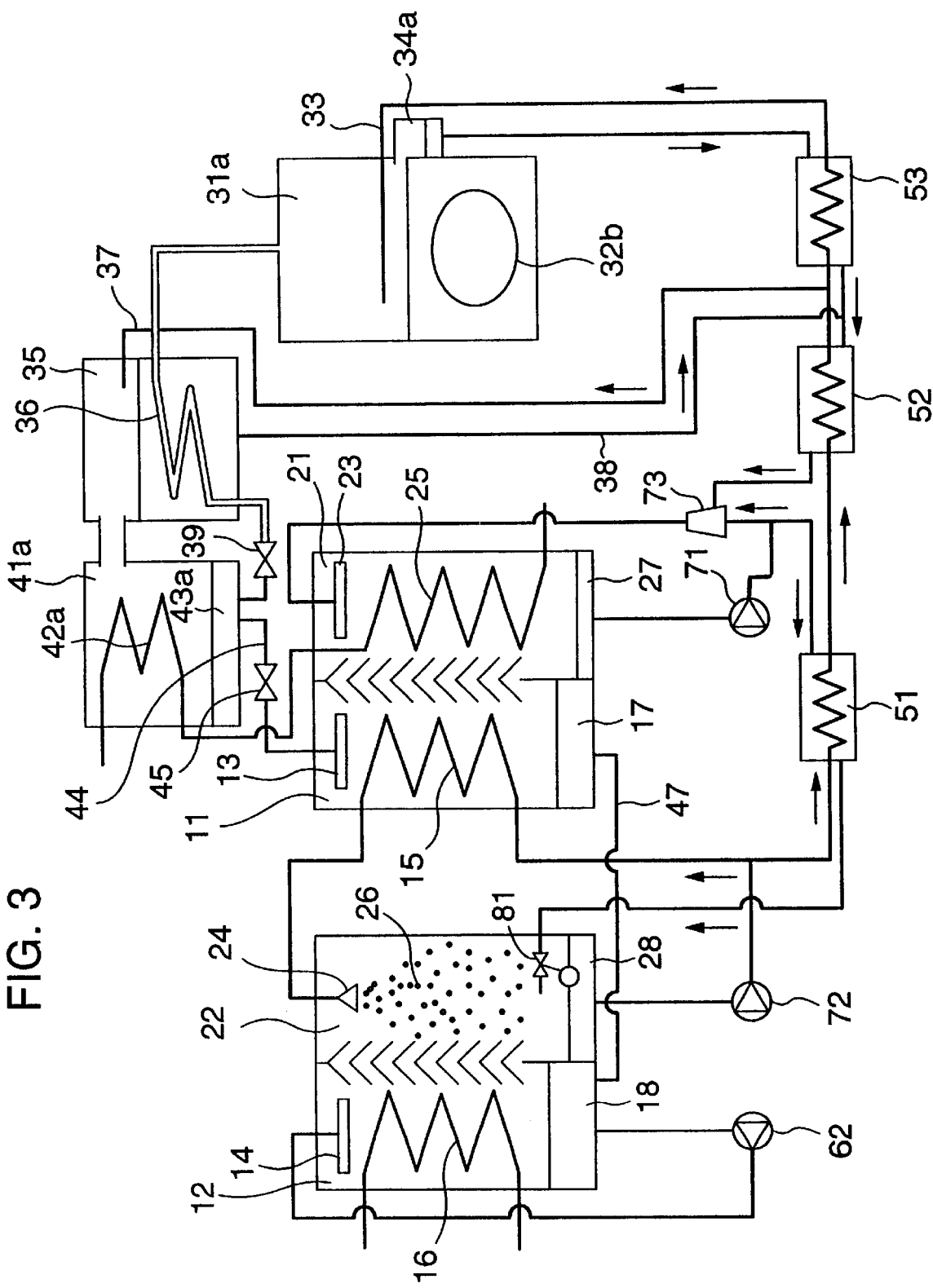
FIGS. 3 to 6 are system diagrams of modifications of the second embodiment of FIG. 2, respectively.

A first modification of the second embodiment of the invention will be described with reference to FIG. 3. This modification differs from the second embodiment in the following points (5) to (7). (5) The recirculation passage for drawing the liquid refrigerant from the refrigerant tank 17, provided at the lower portion of the first evaporator 11, and for leading it to the refrigerant-sprinkling device 13 is omitted. (6) The liquid refrigerant, fed from the condenser 41a, is led directly to the refrigerant-sprinkling device 13. (7) The solution, fed to the high-temperature regenerator 31a, is heated by a burner 32b.

Details of these differences are as follows. The liquid refrigerant, condensed by the condenser 41a, is fed directly to the sprinkling device 13 of the first evaporator 11, and is sprinkled over the heat-transfer pipe 15. At this time, the liquid refrigerant vaporizes on the surface of the heat-transfer pipe 15, so that the solution, flowing through this pipe, is cooled by the latent heat of vaporization. That portion of the liquid refrigerant, which has not vaporized, is collected in the refrigerant tank 17 provided at the lower portion of the first evaporator 11. The refrigerant tank 17 of the first evaporator 11 is communicated with the refrigerant tank 18 of the second evaporator 12 by the refrigerant pipe 47, and that portion of the refrigerant, which has not been vaporized in the first evaporator 11, is fed to the refrigerant tank 18 of the second evaporator 12.

In this modification of the above construction, the provision of the refrigerant pump 61 of the first evaporator 11 is omitted, and the passage (pipe) for recirculating the refrigerant is eliminated. In addition, the liquid refrigerant, fed from the condenser 41a, is fed directly to the refrigerant-sprinkling device 13. With this construction, the pipe for recirculating the refrigerant, as well as the refrigerant pump, become unnecessary, and therefore the low-cost design can be achieved.

Figure 4:
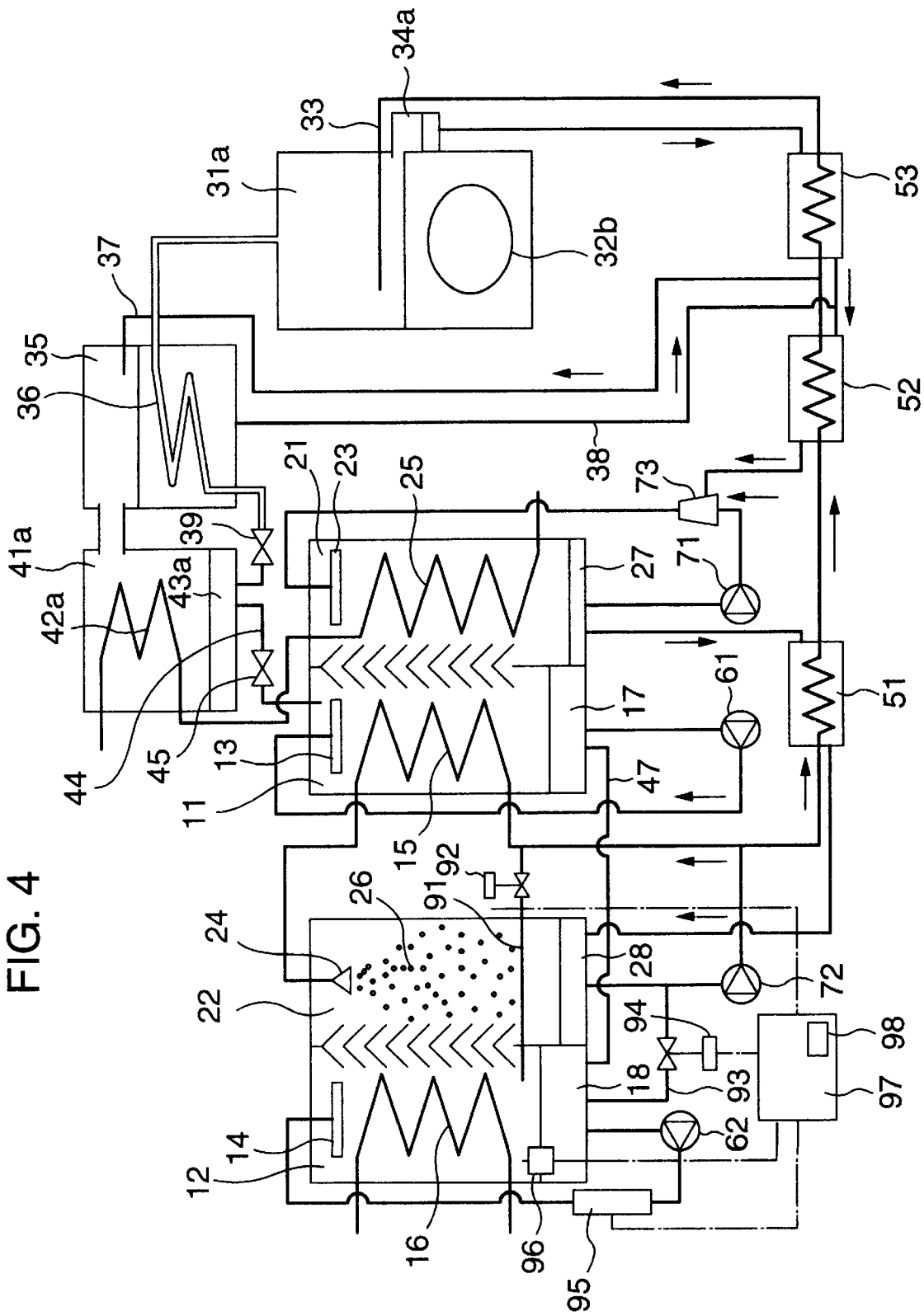

A second modification of the invention will be described with reference to FIG. 4. This modification differs from the embodiment of FIG. 2 and the abovementioned first modification in the following points (8) to (10). (8) There is provided a passage 91 leading from the discharge-side pipe of the solution pump 72 of the second absorber to the refrigerant tank 18 of the second evaporator 12 via a control valve 92. (9) There is provided a passage 93 which communicates the refrigerant tank 18 of the second evaporator with the suction side of the solution pump 72 of the second absorber via a control valve 94. (10) A concentration detection means 95 is provided on the refrigerant sprinkling pipe of the second evaporator 12, and a liquid level detection means 96 for detecting the liquid level of the refrigerant liquid is provided in the refrigerant tank 18 of the second evaporator 12, and there is provided a control means 97 which controls the control valves 92 and 94 in response to signals fed respectively from the concentration detection means 95 and the liquid level detection means 96. In this modification, there is provided the construction (7) as in the first modification, but there are not provided the constructions (5) and (6).

In this modification of the above construction, the refrigerant liquid in the refrigerant tank 18, provided at the lower portion of the second evaporator 12, is fed via the concentration detection means 95 to the sprinkling device 12 by the refrigerant pump 62. Part of the solution is fed to the refrigerant tank 18 via the pipe 91 which branches off from the pipe for feeding the solution to the heat-transfer pipe 15 of the first evaporator 11 and leads to the refrigerant tank 18 of the second evaporator 12. An amount of this solution is controlled by the control valve 92 provided on the pipe 91. The flow rate of the refrigerant in the pipe 93, leading from the refrigerant tank 18 to the solution pump 72, is controlled by the control valve 94 provided on the pipe 93.

The control device 97 inputs the signals from the concentration detection means 95 and the liquid level detection means 96 thereto, and controls the control valves 92 and 94 so that the liquid refrigerant concentration, detected by the concentration detection means 95, becomes a predetermined value. More specifically, the target value of the concentration of the refrigerant in the second evaporator 12 and the upper and lower limit values of the liquid level of the refrigerant tank of the second evaporator 12 are stored in a memory means 98 of the control device 97. When the refrigerant concentration is lower than the predetermined value, the control valve 92 is opened, and in contrast, when the refrigerant concentration is higher than the predetermined value, the control valve 92 is closed. When the liquid level is lower than the predetermined value, the control valve 94 is closed, and in contrast, when the liquid level is higher than the predetermined value, the control valve 94 is opened. The control valves 92 and 94 are thus controlled. Only one of the upper and lower limit values of the liquid level may be stored. In this case, if an allowance range for this predetermined value is beforehand determined, a similar effect can be achieved.

When the refrigerant, mixed with the solution, vaporizes in the second evaporator 12, only the water content evaporates, and salts, which are the solute, will not vaporize. Therefore, once the predetermined concentration is attained, any operation for replenishing and removing the salts (solute) is unnecessary. However, if the droplets are dispersed, so that the solute flows out, thereby lowering the refrigerant concentration, the control valve 92 is opened. At this time, the solution is automatically replenished so as to effect the control for keeping the concentration at the predetermined level.

When the water content decreases with the increase of the amount of vaporization of the refrigerant, so that the refrigerant concentration becomes high, the control valve 92 is closed, thereby stopping the supply of the solution. At this time, the vaporization heat transfer coefficient of the refrigerant of high concentration is lowered, and therefore the amount of vaporization of the refrigerant is lower than the amount of inflow of the refrigerant from the refrigerant tank 17, so that the water content of the mixed refrigerant increases. As a result, the refrigerant concentration is lowered, and the concentration is controlled to the predetermined value.

On the other hand, when the concentration in the refrigerant tank becomes high as a result of dispersion of the solution droplets, the control valve 92 is closed, thereby stopping the supply of the solution. At this time, the vaporization heat transfer coefficient of the refrigerant of high concentration is lowered, and therefore the amount of vaporization of the refrigerant is lower than the amount of inflow of the refrigerant from the refrigerant tank 17. As a result, the amount of the refrigerant increases, so that the liquid level of the refrigerant rises. When the liquid level of the refrigerant rises beyond the predetermined level, the control valve 94 is opened to allow the refrigerant to flow out. As a result, the concentration of the refrigerant and the amount of the refrigerant are both kept at their respective proper values.

As described above, in this modification, there are provided the means for flowing the solution to the refrigerant tank of the second evaporator, and the means for flowing the refrigerant from this refrigerant tank to the solution passage, and the amount of flow of the solution into the refrigerant tank and the amount of flow of the refrigerant from the refrigerant tank are controlled in accordance with the signal from the refrigerant concentration detection means, thereby keeping the refrigerant concentration at the predetermined level. Therefore, the freezing of the refrigerant can be prevented. And besides, the brine of low temperature can be supplied while stably maintaining the vaporization at a temperature under 0° C.

Figure 5:
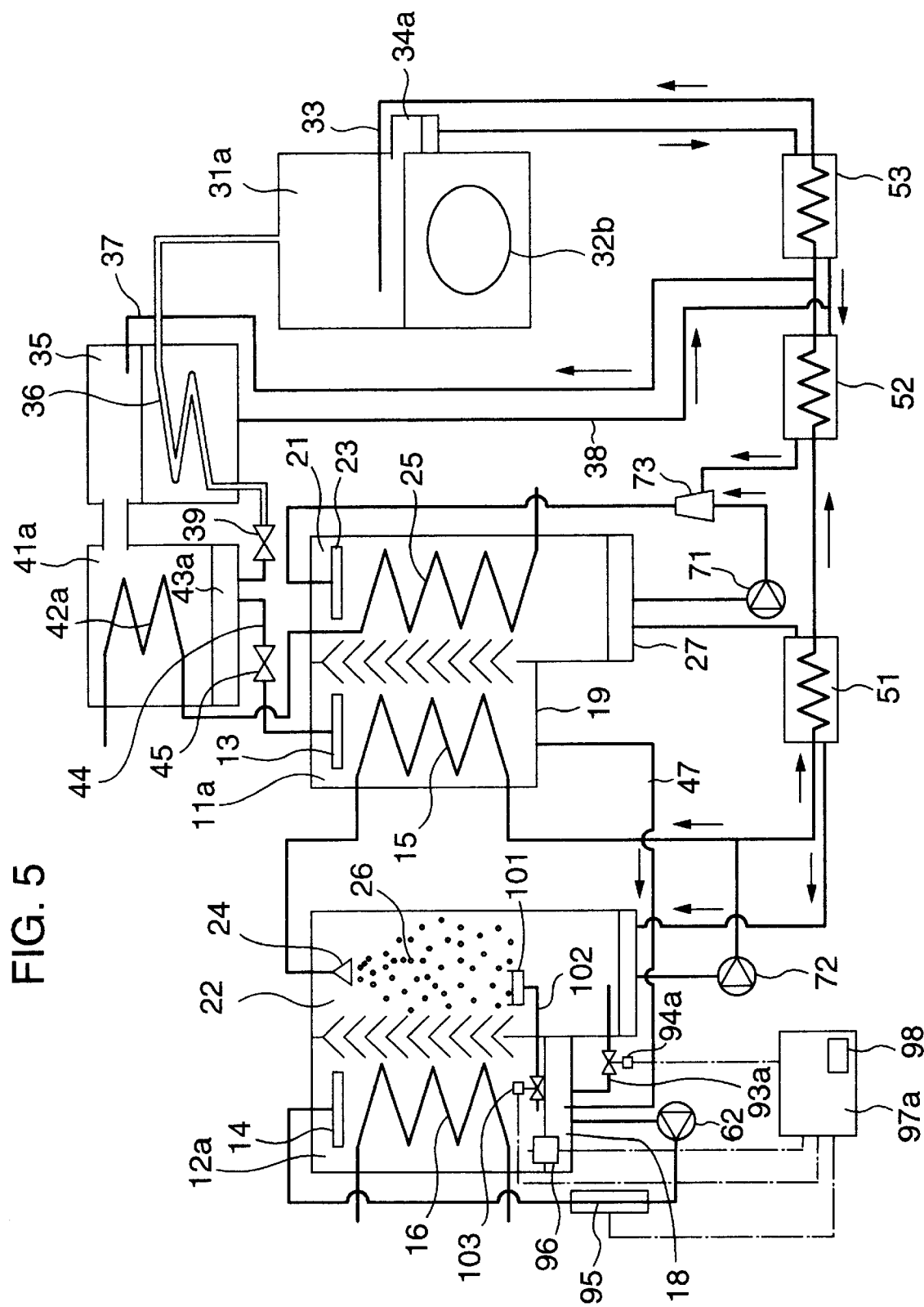

Next, a third modification of the second embodiment of the invention will be described with reference to FIG. 5. This modification differs from the second embodiment and the first and second modifications in the following points (11)

and (12). (11) A solution receiver 101 for receiving part of the sprayed solution and a pipe 102 for leading the solution in the solution receiver 101 to the refrigerant tank 18 via a control valve 103, are provided within the second absorber 22. (12) The solution tank 28, provided at the lower portion of the second absorber 22, is disposed at a level lower than the refrigerant tank 18 of a second evaporator 12a, and there is provided a passage 93a which leads from the refrigerant tank 18 to a central portion of the solution tank 28 via a control valve 94a. A control means 97a is responsive to signals from the concentration detection means 95 and the liquid level detection means 96 for controlling the control valves 103 and 94a. The refrigerant tank 18 of the second evaporator 12a is disposed at a level below a refrigerant receiver 19 of a first evaporator 11a, and the bottom of the first evaporator 11a is communicated with the refrigerant tank 18 of the second evaporator 12a.

In this modification of the above construction, the solution is stored in the solution receiver 101 provided within the second absorber 22, and this solution is fed to the refrigerant tank 18 via the pipe 102. The amount of this solution is controlled by the control valve 103 provided on the pipe 102. The refrigerant liquid level detection means 96 is provided in the refrigerant tank 18, and also there is provided the pipe 93a for feeding the refrigerant from the refrigerant tank 18 to the solution tank 28. Therefore, the flow rate of the refrigerant in the pipe 93a is controlled by the control valve 94a provided on the pipe 93a. As is in the above second modification, the control device 97a inputs the signals from the concentration detection means 95 and the liquid level detection means 96 thereto, and controls the control valves 103 and 94a so that the concentration of the refrigerant becomes a predetermined value.

More specifically, when the concentration of the refrigerant, flowing in the second evaporator 12a, is lowered, for example, when the droplets of the refrigerant are dispersed, so that the solute flows out, the control valve 103 is opened so as to replenish the solution. As a result, the concentration is kept to the predetermined value. Also, when the water content decreases with the increase of the amount of vaporization of the refrigerant, so that the refrigerant concentration becomes high, the control valve 103 is closed, thereby stopping the supply of the solution. At this time, the control valve 94a is opened to allow the refrigerant to flow out, so that the concentration of the refrigerant and the amount of the refrigerant are both kept at their respective proper values. Details of these operations are similar to those described above for the second modification.

As described above, in this modification, the solution is fed from the solution receiver 101, provided within the second absorber 22, to the refrigerant tank 18 of the second evaporator via the control valve 103, and therefore the feeding pressure is smaller as compared with the case where the solution is fed from the discharge-side pipe of the solution pump 72. Therefore, the amount of feed of the solution can be controlled more accurately. Therefore, the concentration of the refrigerant in the refrigerant tank 18 will not become too high, and it is not necessary to make flow the refrigerant in the refrigerant tank inefficiently to the solution side in order to lower the refrigerant concentration.

The solution tank 28 is disposed at a level below the refrigerant tank 18, and the pipe 93a, which discharges the refrigerant when the liquid level of the refrigerant tank 18 becomes higher than the predetermined value, is introduced from the refrigerant tank 18 to the central portion of the solution tank 28. Therefore, the refrigerant is sufficiently diffused in the solution tank, and this prevents concentration corrosion due to the non-uniformity of the refrigerant concentration in the solution tank, and also prevents the formation of a hole in the pipe or a can member.

Figure 6:
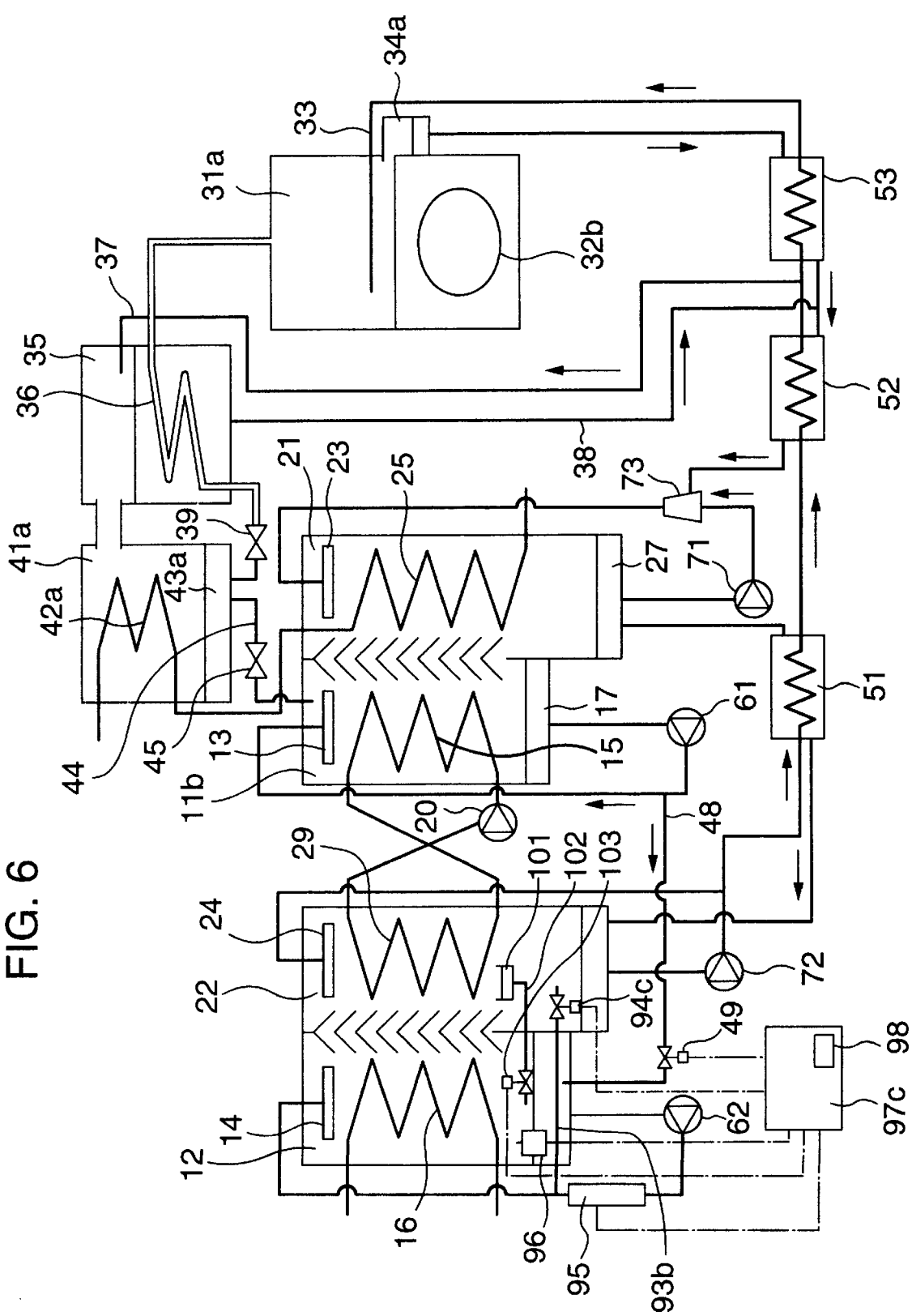

Next, a fourth modification of the second embodiment of the invention will be described with reference to FIG. 6. This modification differs from the above embodiments and the above modifications in the following points (13) to (15). (13) The refrigerant is circulated between the second absorber 22 and a first evaporator 11b,and there is provided a pump 20 for circulating this refrigerant. (14) There is provided a pipe 93b which branches off from the discharge-side pipe of the refrigerant pump 62 of a second evaporator 12b and leads to a central portion of the solution tank 28 of the second absorber 22 via a control valve 94c. (15) A pipe 48, which branches off from the discharge-side pipe of the refrigerant pump 61 of the first evaporator 11b and leads to the refrigerant tank 18 of the second evaporator 12b via a control valve 49, is provided as liquid refrigerant inflow means for making flow the liquid refrigerant into the second evaporator 12b.

In this modification of the above construction, the flow rate of the refrigerant in the pipe 93b (which branches off from the discharge-side pipe of the refrigerant pump 62 and feeds the refrigerant to the solution tank 28) is controlled by the control valve 94c provided on the pipe 93b. The flow rate in the pipe 48, which branches off from the discharge-side pipe of the refrigerant pump 61 of the first evaporator and feeds the refrigerant to the refrigerant tank 18 of the second evaporator, is controlled by the control valve 49. A control device 97c is responsive to signals from the concentration detection means 95 and the liquid level detection means 96 for controlling the control valves 103, 94c and 49 so that this concentration becomes a predetermined value.

When the concentration of the refrigerant is lower than the predetermined value, the degree of opening of the control valve 49 is decreased under the control of the control device 97c. Also, when the concentration of the refrigerant is higher than the predetermined value, the degree of opening of the control valve 49 is increased. When the liquid level is lower than the predetermined lower limit value, the control valve 94c is closed, and also the control valve 103 is opened for a predetermined period of time. When the liquid level is higher than the predetermined higher limit value, the control valve 103 is closed, and also the control valve 94c is opened for a predetermined period of time. Further, the liquid level is between the predetermined higher and lower limits, both the control valves 94c and 103 are closed.

An amount of vaporization in the second evaporator 12b is detected from a change in the refrigerant concentration, and the shortage is covered by adjusting the degree of opening of the control valve 49. The other operations are similar to those described for the above modifications.

In this modification described above, there is provided the pipe 48 which branches off from the discharge-side pipe of the refrigerant pump 61 of the first evaporator 11b and leads to the refrigerant tank 18 of the second evaporator 12b, and also the amount of the refrigerant flowing into the second evaporator 12b is controlled by the control valve 49 provided on the pipe 48. Therefore, the concentration of the refrigerant in the second evaporator 12b can be controlled more accurately, and it is possible to prevent the refrigerant from inefficiently flowing out from the refrigerant tank 18 of the second evaporator 12b in order to control the concentration.

There is provided the pipe 93b which branches off from the discharge-side pipe of the refrigerant pump 62 and leads to the solution tank 28 of the second absorber 22, and an amount of the refrigerant flowing into the second absorber 22 is controlled by the control valve 94c provided on the pipe 93b. Therefore, the concentration can be controlled more positively.

The passage for the medium, flowing through the heat-transfer pipes of the first evaporator 11b and the second absorber 22, is the circulating passage, and therefore the two-stage absorption refrigerating machine can be obtained with the simple construction, and the absorption refrigerating machine can be easily manufactured and installed. Conventional heat exchangers can be used in this passage. In the above description, although the liquid level of the absorber is measured for controlling purposes, using the liquid level gauge, a liquid level switch may be used instead of the liquid level gauge. In this case, the control is easier.

In the above embodiments and modifications, although the absorption refrigerating machine achieves the single effect or the double effect, it may achieve the triple effect. Although water is used as the refrigerant while lithium bromide is used as the absorbent, ammonia may be used as the refrigerant while water may be used as the absorbent.

As described above, in the present invention, the absorption refrigerating machine comprises the first evaporator, the second evaporator, the first absorber and the second absorber, and the second absorber comprises the spray absorber, and the solution, raised in temperature by absorbing the refrigerant vapor in the second absorber, is cooled in the first evaporator, and then is returned to the second absorber. With this construction, the heat-transfer surface of the second absorber can be reduced, and the cost of the system can be reduced.

In the present invention, the refrigerant feed pipe for feeding the refrigerant from the condenser to the first evaporator (high temperature-side evaporator) is connected directly to the refrigerant sprinkling device, provided in the evaporator, so as to sprinkle the refrigerant, and there is provided the refrigerant receiver for collecting that portion of the sprinkled refrigerant which has not vaporized, and also there is provided the refrigerant pipe for feeding the collected refrigerant to the refrigerant tank of the second evaporator. Therefore, the provision of the refrigerant pump of the first evaporator can be omitted, and the cost and the electric power consumption can be reduced.

In the present invention, there are provided the pipe for flowing the solution to the second evaporator (low temperature-side evaporator) via the control valve, the pipe for flowing the mixed refrigerant from the second evaporator to the solution side via the control valve, the concentration detection means for detecting the concentration of the mixed refrigerant in the second evaporator, the liquid level detection means for detecting the liquid level of the mixed refrigerant in the second evaporator, and the control device responsive to the signals from the concentration detection means and the liquid level detection means so as to control the two control valves. Therefore, in the control of the concentration of the mixed refrigerant in the second evaporator, the amount of the refrigerant, which inefficiently flows out from the second evaporator, is reduced, so that the efficiency of the absorption refrigerating machine can be enhanced.

In addition to the above two control valves, there can be provided a valve for controlling an amount of supply of the refrigerant from the first evaporator to the second evaporator, and by doing so, the refrigerant in the second evaporator is prevented from being inefficiently used in order to control the concentration.

The present invention can be performed in various other forms without departing from its spirits and main features. Therefore, the above embodiments and modifications are merely examples of the invention, and should not be construed in a limited sense. The scope of the present invention is represented by the appended claims, and all modifications and changes, belonging to the scope equivalent to the claims, fall within the scope of the invention.

What is claimed is:

1. An absorption refrigerating machine comprising a low-temperature evaporator and a high-temperature evaporator which are arranged in a two-stage manner; and a low-temperature absorber and a high-temperature absorber which are arranged in a two-stage manner;

wherein said low-temperature absorber comprises a spray absorber, and a solution, raised in temperature by absorbing a refrigerant in said low-temperature absorber, is fed to said high-temperature evaporator to be cooled, and said cooled solution is sprayed in said low-temperature absorber.

2. An absorption refrigerating machine comprising a regenerator for heating an absorption solution; a condenser for condensing the refrigerant fed from said regenerator; a first evaporator for vaporizing the refrigerant condensed by said condenser, said first evaporator having a heat-transfer pipe provided therein, through which pipe a fluid to be cooled flows; a second evaporator having a heat-transfer pipe through which chilled water or brine flows; a first absorber for causing the refrigerant, vaporized in said first evaporator, to be absorbed by a solution, said first absorber having a first solution pump; and a second absorber which has a second solution pump and a spray device, and causes the refrigerant, vaporized in said second evaporator, to be absorbed by the absorption solution, and supplies said absorption solution, having absorbed said refrigerant, to said spray device by the use of said second solution pump; wherein there is provided a pipe for feeding said absorption solution in said second absorber to said heat-transfer pipe in said first evaporator.

3. An absorption refrigerating machine according to claim 2, in which said first evaporator comprises a refrigerant sprinkling device for sprinkling the liquid refrigerant, and refrigerant-collecting means provided at a lower portion thereof for collecting that portion of said sprinkled refrigerant which has not vaporized, and said second evaporator comprises a refrigerant tank provided at a lower portion thereof for storing the refrigerant, and said refrigerant-collecting means is communicated with said refrigerant tank.

4. An absorption refrigerating machine according to claim 3, in which said refrigerant tank of said second evaporator is disposed at a level below said refrigerant-collecting means of said first evaporator.

5. An absorption refrigerating machine according to claim 4, in which said condenser has a liquid refrigerant-collecting portion provided at a lower portion thereof, and said liquid refrigerant-collecting portion is communicated with said refrigerant sprinkling device, and there is provided solution mixing means for supplying the absorption solution in said second absorber to the refrigerant in said second evaporator.

6. An absorption refrigerating machine according to claim 3, in which there is provided solution mixing means for supplying the absorption solution in said first absorber or said second absorber to the refrigerant in said second evaporator.

7. An absorption refrigerating machine according to claim 6, in which there is provided refrigerant outflow means for feeding the liquid refrigerant in said second evaporator to said second absorber or a suction side of said second solution pump.

8. An absorption refrigerating machine according to claim 6, in which there are provided (a) refrigerant outflow means, which comprises a pipe, communicating said refrigerant tank with said second absorber or the suction side of said second solution pump, and a first control valve provided in said pipe, (b) second sprinkling means for sprinkling the mixed solution in said second evaporator, (c) concentration detection means for detecting the concentration of the mixed solution supplied to said second sprinkling means by said second refrigerant pump, and (d) a control device for controlling an amount of at least refrigerant and solution flowing in or flowing out from the second evaporator; and said solution mixing means comprises an absorption solution pipe for feeding the absorption solution in said second absorber to said second evaporator and a second control valve provided in said absorption solution pipe, and said control device controls said first and second control valves in accordance with a concentration signal detected by said concentration detection means.

9. An absorption refrigerating machine according to claim 2, in which said first evaporator comprises refrigerant sprinkling means for sprinkling the liquid refrigerant, refrigerant-collecting means provided at a lower portion thereof for collecting that portion of the sprinkled refrigerant which has not vaporized and a first refrigerant pump for feeding the refrigerant in said refrigerant-collecting means to said refrigerant sprinkling means, and said second evaporator comprises a refrigerant tank provided at a lower portion thereof for storing the refrigerant, and there are provided (a) solution mixing means for supplying the absorption solution in said first absorber or said second absorber to said second evaporator, (b) a refrigerant pipe for supplying the liquid refrigerant from said condenser to said first evaporator, (c) a connection pipe connecting a discharge side of said first refrigerant pump to said second refrigerant tank, (d) a third control valve provided in said connection pipe, (e) second sprinkling means for sprinkling the mixed solution in the second evaporator, (f) concentration detection means for detecting the concentration of the mixed solution fed to said second sprinkling means, and (g) a control device for controlling said third control valve in accordance with a concentration signal detected by said concentration detection means.

10. An absorption refrigerating machine according to claim 9, in which there is provided solution mixing means which comprises a first pipe for feeding the liquid refrigerant, collected in said second evaporator, to said second absorber or the suction side of said second solution pump, a first control valve provided in said first pipe, a second pipe for feeding the absorption solution in said second absorber to said second evaporator and a second control valve provided in said second pipe, and there is provided liquid level detection means for detecting a liquid level of the mixed refrigerant in said second evaporator, and said control device has memory means for storing a target value of the concentration of the refrigerant in said second evaporator and one of upper and lower limit values of the liquid level in said second evaporator, and said third control valve is controlled using the refrigerant concentration detected by said concentration detection means and the target concentration stored in said memory means, and the liquid level detected by said liquid level detection means is compared with one of the upper and lower limit values stored in said memory means, and when the detected liquid level is higher than upper limit, said first control valve is opened for a predetermined period of time.

11. An absorption refrigerating machine according to claim 10, in which said solution mixing means comprises a pipe communicating the discharge side of said second solution pump with said second evaporator or the suction side of said second refrigerant pump, and the second control valve provided in said pipe.

12. An absorption refrigerating machine according to claim 10, in which said solution mixing means comprises (a) absorption solution-collecting means for collecting the absorption solution sprinkled in said second absorber, said absorption solution-collecting means being disposed at a level above said second refrigerant tank, (b) a pipe communicating said absorption solution-collecting means with said second refrigerant tank, and (c) the second control valve provided in said pipe.

13. An absorption refrigerating machine according to claim 10, in which said liquid level detection means comprises an upper limit liquid level switch for detecting an upper limit value of the liquid level and a lower limit liquid level switch for detecting a lower limit value of the liquid level, and when said upper limit liquid level switch is operated, said control device opens said first control valve for the predetermined period of time, and when said lower limit liquid level switch is operated, said control device opens said second control valve for a predetermined period of time.

14. An absorption refrigerating machine comprising a first evaporator, a second evaporator, a first absorber, a second absorber, a regenerator, a condenser and a solution heat exchanger, and water is used as a refrigerant and a water solution of salt is used as an absorbent, and said first absorber has a first solution pump and said second absorber has a second solution pump, and heat exchange means for cooling absorption heat generated in said second absorber is provided in said first evaporator, and there is provided solution mixing means which feeds vapor of the refrigerant produced in said first evaporator to said first absorber, and feeds vapor of the refrigerant produced in said second evaporator to said second absorber, and feeds the absorption solution in one of said first absorber and said second absorber to said second evaporator.

15. An absorption refrigerating machine according to claim 14, in which a first heat-transfer pipe, through which the fluid to be cooled flows, is provided in said first evaporator, and a second heat-transfer pipe is provided in said second absorber, and there is provided a communication pipe communicating said second heat-transfer pipe with said first heat-transfer pipe.

16. An absorption refrigerating machine according to claim 15, in which there are provided (a) a refrigerant pipe for supplying the liquid refrigerant from said condenser to said first evaporator, (b) a first refrigerant pump for supplying the refrigerant to said first evaporator, (c) a connection pipe connecting the discharge side of said first refrigerant pump to a second refrigerant tank, (d) a third control valve provided in said connection pipe, (e) second sprinkling means for sprinkling the mixed solution in said second evaporator, (f) concentration detection means for detecting the concentration of the mixed solution supplied to said second sprinkling means, and (g) a control device responsive to a concentration signal detected by said concentration detection means so as to control said third control valve.

17. An absorption refrigerating machine according to claim 16, in which there are provided (a) a second refrigerant pump for supplying the refrigerant to said second evaporator, (b) refrigerant outflow means having a second communication pipe communicating the discharge side of said second refrigerant pump with said second absorber or the suction side of said second solution pump and a first control valve provided in said second communication pipe and (c) a liquid level detection means for detecting a liquid level of the mixed refrigerant in said second evaporator, and said solution mixing means comprises an absorption solution pipe for feeding the absorption solution in said second absorber to said second evaporator and a second control valve provided in said absorption solution pipe, and said control device has memory means for storing a target value of the concentration of the refrigerant in said second evaporator and one of upper and lower limit values of the liquid level in said second evaporator, and said control device controls said third control valve by using the refrigerant concentration detected by said concentration detection means and the target concentration stored in said memory means, and the liquid level detected by said liquid level detection means is compared with one of the upper and lower limit values stored in said memory means, and if the detected liquid level is higher than upper limit, said first control valve is opened for a predetermined period of time.

18. An absorption refrigerating machine according to claim 17, in which said solution mixing means comprises a third communication pipe communicating the discharge side of said second solution pump with said second evaporator or the suction side of said second refrigerant pump, and the second control valve provided in said third communication pipe.

19. An absorption refrigerating machine according to claim 17, in which said solution mixing means comprises (a) absorption solution-collecting means for collecting the absorption solution sprinkled in said second absorber, said absorption solution-collecting means being disposed at a level above said second refrigerant tank, (b) a fourth communication pipe communicating said absorption solution-collecting means with said second refrigerant tank, and (c) the second control valve provided in said fourth communication pipe.

20. An absorption refrigerating machine according to claim 17, in which said liquid level detection means comprises an upper limit liquid level switch for detecting an upper limit value of the liquid level and a lower limit liquid level switch for detecting a lower limit value of the liquid level, and when said upper limit liquid level switch is operated, said control device opens said first control valve for the predetermined period of time, and when said lower limit liquid level switch is operated, said control device opens said second control valve for a predetermined period of time.

21. An absorption refrigerating machine according to claim 14, in which said first evaporator comprises a refrigerant sprinkling device for sprinkling the liquid refrigerant and refrigerant-collecting means provided at a lower portion thereof for collecting that portion of said sprinkled refrigerant which has not vaporized, and said second evaporator comprises a refrigerant tank provided at a lower portion thereof for storing the refrigerant, and said refrigerant-collecting means is communicated with said refrigerant tank.

22. An absorption refrigerating machine according to claim 21, in which there is provided refrigerant outflow means for feeding the liquid refrigerant in said second evaporator to said second absorber or the suction side of said second solution pump.

23. An absorption refrigerating machine according to claim 21, in which there are provided (a) refrigerant outflow means which comprises a pipe communicating said refrigerant tank with said second absorber or the suction side of said second solution pump and a first control valve provided in said pipe, (b) solution mixing means which comprises a pipe for feeding the absorption solution in said second absorber to said second evaporator and a second control valve provided in said pipe, (c) second sprinkling means for sprinkling the mixed solution in said second evaporator, (d) concentration detection means for detecting the concentration of the mixed solution supplied to said second sprinkling means by said second refrigerant pump and (e) a control device for controlling said first and second control valves in accordance with a concentration signal detected by said concentration detection means.

\* \* \* \* \*